Patented Jan. 13, 1925.

1,522,822

UNITED STATES PATENT OFFICE.

EMIL KÜHN, OF BASEL, SWITZERLAND, ASSIGNOR TO "ELEKTRIZITATSWERK LONZA," OF GAMPEL AND BASEL, SWITZERLAND.

ARTIFICIAL COMPOSITION.

No Drawing. Application filed January 3, 1923. Serial No. 610,525.

*To all whom it may concern:*

Be it known that I, EMIL KÜHN, a citizen of the Swiss Republic, and resident of Basel, Switzerland, have invented a new and useful Artificial Composition, of which the following is a full, clear, and exact specification.

As is well known various substances, so-called filling materials, such as talc, soot, gypsum, red lead, etc., are mixed with caoutchouc for its technical utilization. These inorganic admixtures possess the disadvantage that they prejudicially affect the properties of the caoutchouc to an extent corresponding to the quantity added. In this manner manufactured rubber goods, such as hose, valves, plates, etc., become in a short time hard and liable to crack.

Now, I have found that a durable, and for many purposes a particularly suitable, caoutchouc can be obtained by incorporating with it solid polymerization products of acetylene resulting from the condensation of acetylene in the presence of copper, or other finely divided metals, or their salts or alloys, or through dark electric discharges. These products of polymerization of acetylene, which I designate by cuprene, are of themselves highly flexible and tough although of extremely low density in contradistinction to the inorganic filling materials above referred to. Obviously other filling materials can be additionally employed beside the acetylene condensation products which are preferably employed in finely divided state.

Cuprene is obtained by polymerizing acetylene in presence of copper or by means of a dark electrical discharge. It may be stated that the cuprene, a polymerization-product of acetylene, is used here as a simple filler in the plastic composition, particularly as a substitute for cork meal, sawdust, etc.

What I claim is:—

An artificial composition of elastic nature composed of an intimate mixture of caoutchouc material with an acetylene condensation product (cuprene).

In witness whereof I have hereunto signed my name this 15th day of December 1922, in the presence of two subscribing witnesses.

EMIL KÜHN.

Witnesses:
 LUCIEN PECARD,
 JULIA A. DÜRST.